(12) United States Patent
Biondi et al.

(10) Patent No.: US 11,598,401 B2
(45) Date of Patent: Mar. 7, 2023

(54) ROTARY GEAR TRAIN ASSEMBLY FOR INCREASING HARD STOP MOTOR TRAVEL

(71) Applicant: MAGNA CLOSURES INC., Newmarket (CA)

(72) Inventors: Giulio Biondi, Newmarket (CA); Luca Bigazzi, Ponsacco (IT); Francesco Cumbo, Pisa (IT)

(*) Notice: Subject to any disclaimer, the term of this patent is extended or adjusted under 35 U.S.C. 154(b) by 30 days.

(21) Appl. No.: 17/185,114

(22) Filed: Feb. 25, 2021

(65) Prior Publication Data

US 2021/0285529 A1  Sep. 16, 2021

Related U.S. Application Data

(60) Provisional application No. 62/989,115, filed on Mar. 13, 2020.

(51) Int. Cl.
*F16H 35/00* (2006.01)
*F16H 19/00* (2006.01)

(52) U.S. Cl.
CPC .......... *F16H 35/00* (2013.01); *F16H 19/001* (2013.01); *F16H 2019/008* (2013.01); *F16H 2035/006* (2013.01)

(58) Field of Classification Search
CPC ............. F16H 19/001; F16H 2035/006; F16H 2019/008
See application file for complete search history.

(56) References Cited

U.S. PATENT DOCUMENTS

| 3,777,591 | A | * | 12/1973 | Thomasian | G05G 5/04 192/139 |
| 4,641,544 | A | * | 2/1987 | Russ | E05F 15/611 74/435 |
| 6,130,514 | A | * | 10/2000 | Oesterholt | B60R 1/074 359/872 |
| 7,008,067 | B2 | | 3/2006 | Hsu | |
| 7,192,066 | B2 | | 3/2007 | Ilea et al. | |
| 8,424,406 | B2 | * | 4/2013 | Wintsch | F16K 31/535 74/421 A |
| 9,506,539 | B2 | | 11/2016 | Ta et al. | |
| 10,337,231 | B2 | | 7/2019 | Wang et al. | |
| 2009/0301238 | A1 | | 12/2009 | Wintsch et al. | |
| 2016/0186468 | A1 | | 6/2016 | Ilea | |
| 2016/0244999 | A1 | | 8/2016 | Ottino et al. | |
| 2019/0063117 | A1 | | 2/2019 | Mozola | |
| 2019/0085599 | A1 | | 3/2019 | Tomaszewski | |
| 2019/0368237 | A1 | | 12/2019 | Distefano et al. | |
| 2020/0080350 | A1 | | 3/2020 | Tomaszewski et al. | |
| 2020/0131836 | A1 | | 4/2020 | Ottino | |

* cited by examiner

*Primary Examiner* — Jake Cook

(57) ABSTRACT

A gear arrangement comprising: a housing having a gear axis and a housing stop, the housing stop having a first and second abutment; a rotatable member mounted on the gear axis having a first side having a first stop and a second having a second stop, the first stop is positioned between the first abutment and the second abutment; and a gear mounted on the gear axis having a first gear side, and a second gear side having a gear stop, the gear stop is engageable and disengageable with the second stop during rotation of the gear about the gear axis, the rotatable member positioned between the housing and the gear; wherein said rotation of the gear is hindered while the gear stop and the second stop are engaged when the first stop enters into engagement with either the first abutment or the second abutment.

10 Claims, 11 Drawing Sheets

ROTARY GEAR TRAIN ASSEMBLY FOR INCREASING HARD STOP MOTOR TRAVEL

CROSS-REFERENCE TO RELATED APPLICATION

This applications claims priority from the benefit of the filing date of U.S. Provisional Patent Application No. 62/989,115 filed on Mar. 13, 2020, entitled "ROTARY GEAR TRAIN ASSEMBLY FOR INCREASING HARD STOP MOTOR TRAVEL", the contents of which are herein incorporated by reference.

FIELD

The present application relates to gear arrangements.

BACKGROUND

It is known that gear arrangements, e.g. such as those utilized in gear reduction mechanism, utilize an internal stop for a gear which rotates in both directions. However, one disadvantage of current internal stop designs is that the gear cannot rotate over an angle greater than 360 degrees in a selected direction until coming up against the internal stop.

As such, it is envisioned that alternative internal stop designs are needed to facilitate full travel end for rotations greater than 360 degrees. Accordingly, activation range of a motor (in a gear reduction mechanism) would be limited by the rotational range of its gearing e.g. part of a gear hitting a hard stop. Needed is an improved system that extends the rotation of the gear (e.g. driven by a motor) before the gear contacts a hard stop. It is recognized that hitting a hard stop in a gear reduction mechanism can cause a stall condition.

SUMMARY

It is an object of the present invention to provide a gear arrangement to obviate or mitigate at least one of the above presented disadvantages.

A first aspect provided is a gear arrangement comprising: a housing having a gear axis and a housing stop, the housing stop having a first abutment and an second abutment spaced apart from one another about the gear axis; a rotatable member mounted on the gear axis, the rotatable member having a first member side having a first member stop and a second member side having a second member stop, the first member side opposite the second member side, such that the first member stop is positioned between the first abutment and the second abutment; and a gear mounted on the gear axis, the gear having a first gear side, and a second gear side having a gear stop, the first gear side opposite the second gear side, such that the gear stop is engageable and disengageable with the second member stop during rotation of the gear about the gear axis, the rotatable member positioned between the housing and the gear; wherein said rotation of the gear is hindered while the gear stop and the second member stop are engaged when the first member stop enters into engagement with either the first abutment or the second abutment.

A second aspect provided is a method of controlling rotation of a gear with respect to a housing stop of a housing, the method comprising the steps of: rotating the gear about a gear axis in a first direction during a first stage, such that a gear stop of the gear is decoupled from the housing stop, the gear rotating relative a rotatable member also mounted on the gear axis; engaging the gear stop with a first member stop of the rotatable member; rotating conjointly the gear and the rotatable member in the first direction during a second stage while the gear stop and the first member are engaged; and hindering said rotating conjointly when a first member stop of the rotatable member engages with an abutment of the housing stop, such that engagement of the first member stop with the abutment causes the gear stop to become coupled with the abutment.

A third aspect provided is a gear arrangement comprising: a housing having a housing stop; a rotatable member, the rotatable member engageable and disengageable with the housing stop; and a gear having a gear stop, the gear stop engageable and disengageable with the rotatable member during rotation of the gear; wherein said rotation of the gear is not hindered while the rotatable member is disengaged from the housing stop.

A fourth aspect provided is a housing having a housing stop, the housing comprising: a rotatable member, the rotatable member engageable with and disengageable from the housing stop; and a gear having a gear stop, the gear stop engageable with and disengageable from the rotatable member during rotation of the gear, the rotatable member positioned adjacent to the gear; wherein the gear is configured for a rotation greater than three hundred and sixty degrees before being hindered by the engagement of the rotatable member with the housing stop when the gear stop is engaged with the rotatable member.

A fifth aspect provided is a method of controlling rotation of a gear with respect to a housing stop of a housing, the method comprising the steps of: rotating the gear in a first direction during a first stage, the gear rotating relative a rotatable member such that the gear is adjacent to the rotatable member; engaging a gear stop of the gear with the rotatable member; rotating conjointly the gear and the rotatable member in the first direction during a second stage while the gear stop and the rotatable member are engaged; and hindering said rotating conjointly when the rotatable member engages with the housing stop.

BRIEF DESCRIPTION OF THE DRAWINGS

The foregoing and other aspects will now be described by way of example only with reference to the attached drawings, in which.

DESCRIPTION

Figure 1:
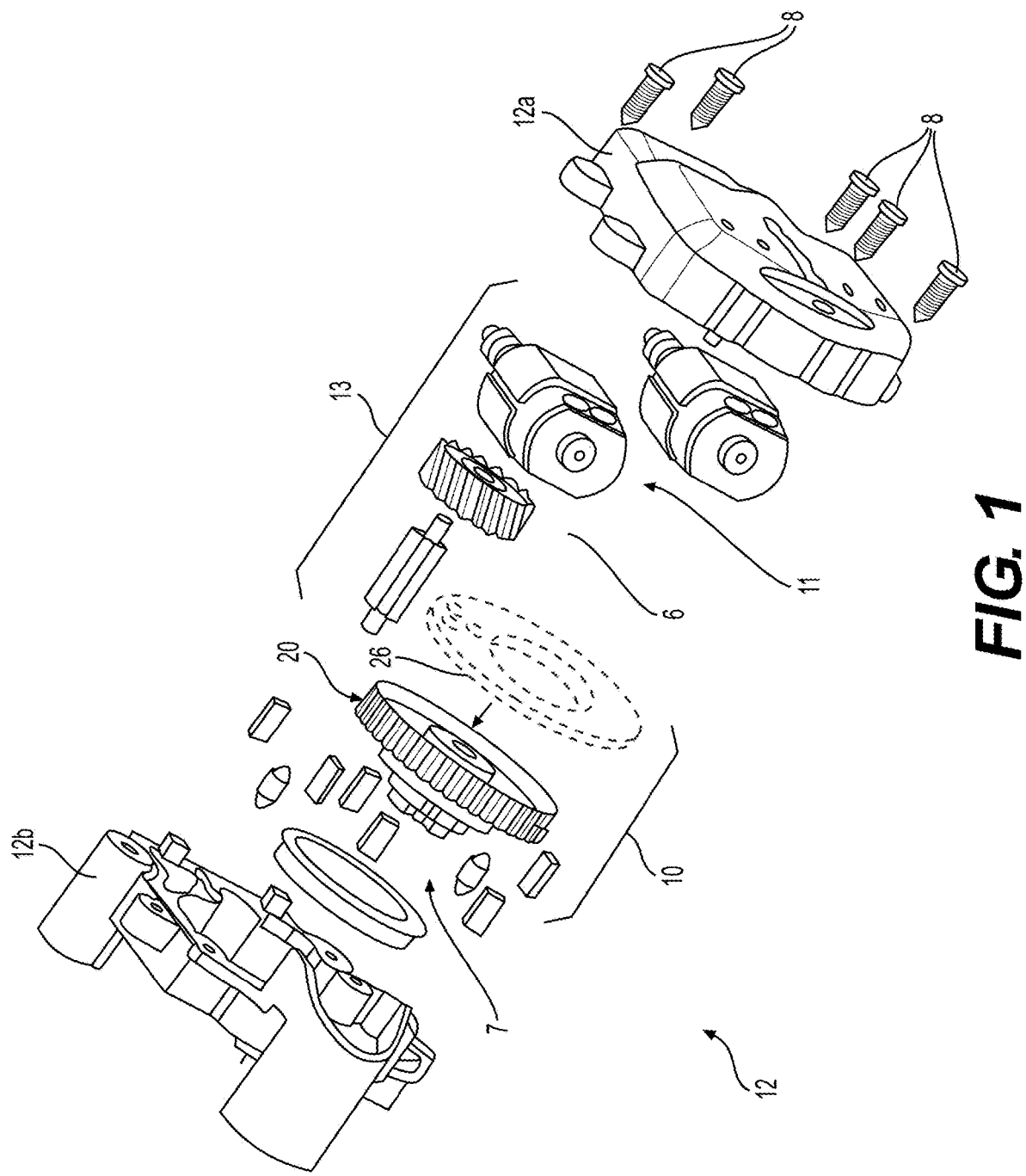
FIG. 1 is a perspective exploded view of gear arrangement incorporated by example in a gear reduction mechanism.
Figure 1A:
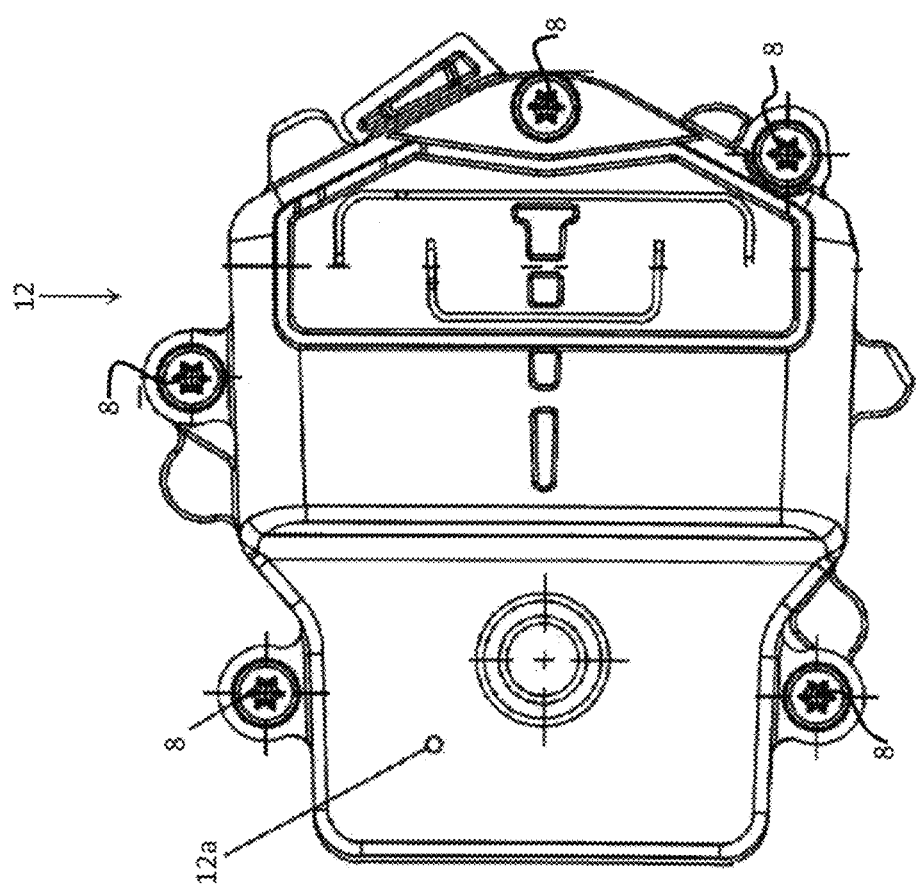
FIG. 1A is a plan view of a housing for the gear reduction mechanism of FIG. 1, in accordance with an illustrative embodiment.
Figure 2:
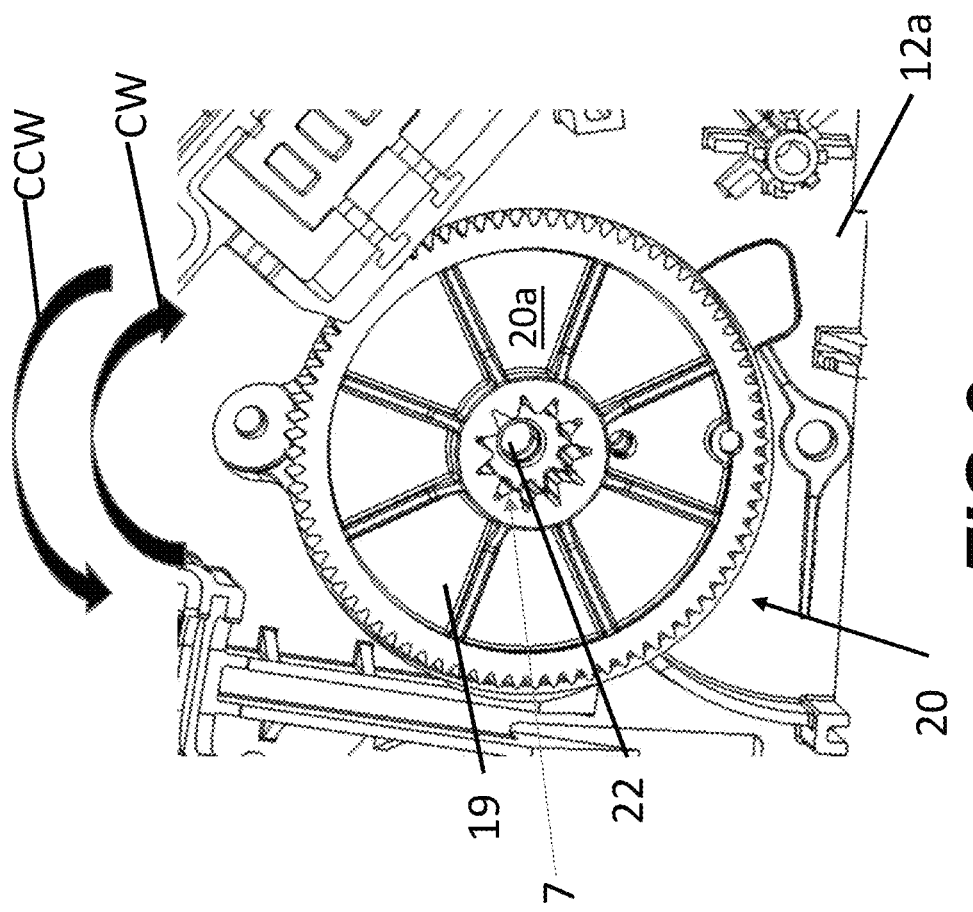
FIG. 2 is a top view of a portion of a housing of FIG. 1 showing placement of a gear.

Referring to FIGS. 1 and 1A, shown is a gear arrangement 10 positioned in a housing 12 (e.g. having a first housing portion 12a for mating with a second housing portion 12b). The housing portions 12a, 12b, for example when connected together via fasteners 8, For example, the housing 12 could be used to house a gear box reduction mechanism 13 positioned in an interior 6 of the housing 12, of which a gear 20 is one of a plurality of gears 11 of the gear box reduction mechanism 13. Gear 20 may be configured with an output 7, such as lug or cam or pivotal connection such as a pin and slot connection for example, or other coupling provided on one of its faces, or with a toothed socket as shown in FIG. 2, or as another gear coupled to the teeth of the gear 20 as non-limiting examples, for coupling the rotation of the gear 20 to an actuatable mechanism. Housing 12 may be provided as a separate standalone housing, such as a housing for a cinch mechanism as is shown in US patent application No. 20190368237A1 entitled "Power actuator with self disengaging clutch unit", or may be formed as part of a housing for enclosing other actuatable components such as shown in United States Patent Application No. 20160186468A1, entitled "Dual motor device with application to power cinch and latch mechanism" the entire contents of which are incorporated herein by reference in their entireties. For example housing 12 may be a housing of a power release latch for housing both a power release motor, gear train, and the latch mechanism, such as shown in United States Patent Application No. 20190063117A1 entitled "Spring assisted actuator for power release and/or cinching functionality" the entire content of which is incorporated herein by reference. For example housing 12 may be a housing of a cinching latch for housing both a power cinching mechanism and the latch mechanism, such as shown in United States Patent Application No. 20160244999A1 entitled "Dual motor latch assembly with power cinch and power release having soft opening function" the entire content of which is incorporated herein by reference The teachings herein may also be applied to other types of actuator, such as to an actuator for moving a closure panel, such as a window for example, as shown in U.S. Pat. No. 10,337,231B2 entitled "BLDC window lift motor system", or as shown in US Patent Application No. 20200131836A1 the entire contents of which are incorporated herein by reference in their entireties.

Figure 3:
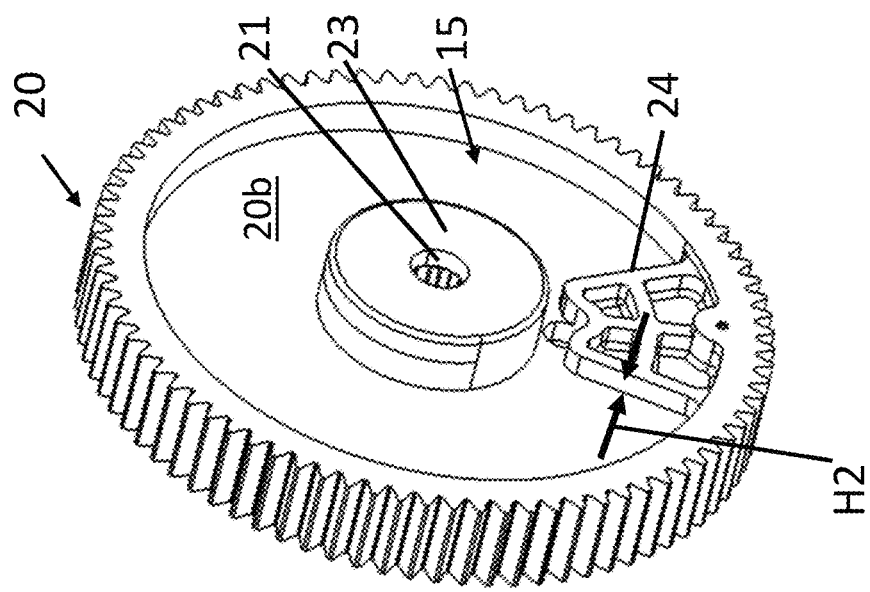
FIG. 3 is a perspective view of the gear of FIG. 2.

Referring to FIGS. 2 and 3, the gear 20 is rotationally mounted on a gear axis 22 of the housing 12, e.g. via axis mounting 21 (e.g. an aperture in a gear body 19 of the gear 20), such that the gear 20 is able to rotate both clockwise CW and counter clockwise CCW about the gear axis 22, i.e. also referred to as first and second directions. The gear axis 22 can be provided by a pin (not shown), which can be used to mount the gear 20 to the gear axis 22 via the axis mounting 21 (e.g. the aperture in the gear body 19). The gear body 19 has a first gear side 20a (see FIG. 2) and a second gear side 20b (see FIG. 3). Referring again to FIG. 2, the gear side 20b has a gear stop 24 positioned thereon, such that the gear stop 24 is used to arrest rotation of the gear 20 about the gear axis 22 when further travel of the gear stop 24 about the gear axis 22 is inhibited, as further described below.

The gear side 20b also has a member mount 23 (e.g. raised portion—such as circular in shape) positioned about the axis mounting 21, suitable for mounting a rotatable member 26 (e.g. disk 26—shown by example in ghosted view in FIG. 1) thereon, such that the mounted rotatable member 26 can also rotate about the gear axis 22 when mounted to the gear 20 and/or housing 12 (via the member mount 23). A member body 27 (see FIG. 5) of the rotatable member 26 has a gear mount 28 (e.g. aperture), which is configured as compatible with mounting the member body 27 to the member mount 23 of the gear 20, such that (when mounted) the rotatable member 26 is free to rotate about the gear axis 22 relative to the gear body 19. In other words, once the gear arrangement 10 is assembled (i.e. the gear body 19 is mounted on the gear axis 22 and the member body 27 is mounted to the gear body 19—see FIGS. 6a,b,c) via engagement of the member mount 23 and the gear mount 28, the gear 22 and the rotatable member 26 are free to rotate relative to one another for at least a portion of their respective rotations about the gear axis 22, as further described below.

The second gear side 20b can have a recess 15, see FIG. 3, such that the rotatable member 26 is positioned at least partly within the recess 15 when situated on the gear axis 22 between the housing 12 and the gear 20. For example, the second member stop 29b can project from a side 17 (of the second gear side 20b) of the gear 20 and into the housing stop 14, when provided as a cavity 14a, see FIGS. 4, 7, 8.

Referring again to FIG. 5, the member body 27 (of the rotatable member 26) has a first member side 26a and a second member side 26b. The first member side 26a has a first raised lip 30a projecting from the first member side 26a, such that the first raised lip 30a projects around the gear mount 28. A height H1 of the first raised lip 30a is commensurate with a height H2 of the gear stop 24 (projecting from the second gear side 20b—see FIG. 3), such that when the first member side 26a is mounted adjacent to the second gear side 20b, the gear stop 24 can travel along the surface of first member side 26a as the gear 20 and the rotatable member 26 rotate relative to one another about the gear axis 22.

Figure 7:
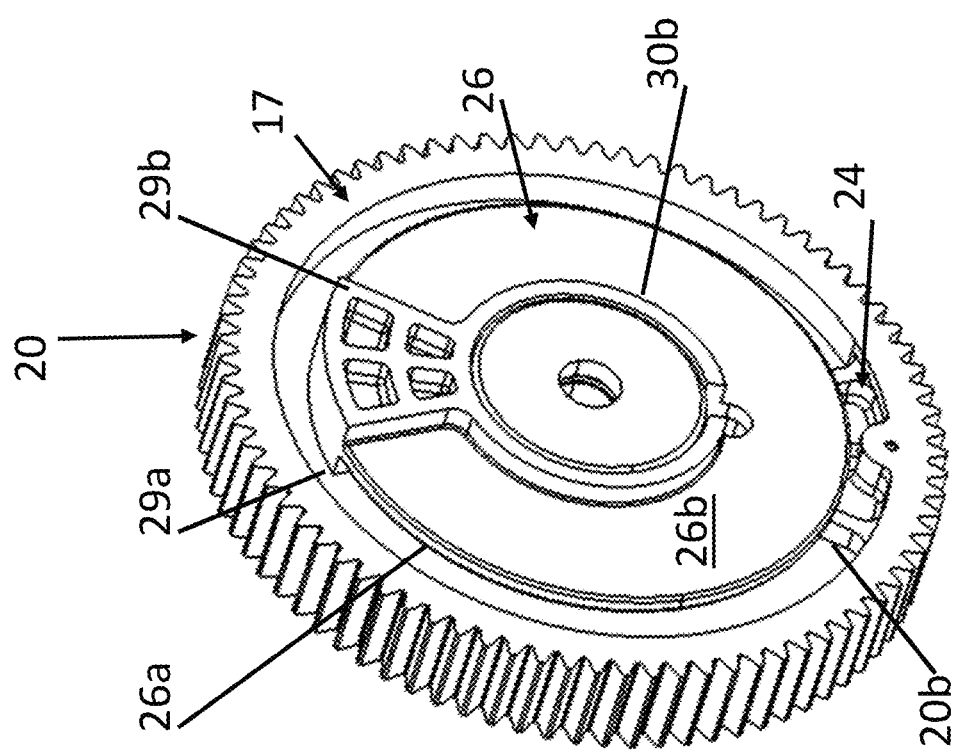
FIG. 7 is a perspective view of the gear arrangement of FIG. 1 showing assembly of the gear with the rotatable member.

See FIG. 7 shows the gear 20 and the rotatable member 26 mounted to one another, such that the housing 12 is removed for clarity purposes only. The first member side 26a also has a first member stop 29a projecting from the first member side 26a, such that the gear 20 and the rotatable member 26 can rotate relative to one another (about the gear axis 22) until the gear stop 24 and the first member stop 29a come into contact with one another (see FIGS. 11a, b, c), as further described below.

As shown in FIG. 7, once assembled, the first member stop 29a is positioned between the first member side 26a and the second gear side 20b. Similarly, the gear stop 24 is positioned between the first member side 29a and the second gear side 20b. Accordingly, as the gear body 19 and the member body 27 are free to rotate relative to one another about the gear axis 22, these bodies 19, 27 will rotate relative to one another as long as the first member stop 29a and the gear stop 24 are not in contact with one another. Alternatively, as further described below, when the gear stop 24 and the first member stop 29a come into contact with one another, the gear 20 and the rotatable member 26 will rotate conjointly (i.e. together or otherwise simultaneously) about the gear axis 22 until a second member stop 29b contacts a housing stop 14, as further described below.

Figure 8:
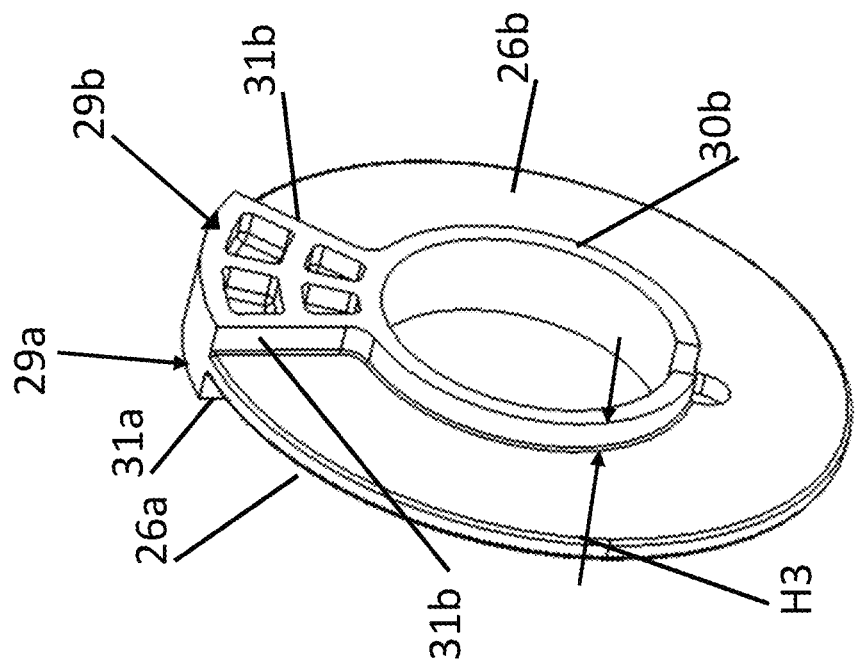
FIG. 8 is further perspective view of the rotatable member of FIG. 5.

Further to the above, it is recognised that, as shown in FIG. 8, the first member stop 29a and the second member stop 29b of the rotatable member 26 can be directly opposite to one another, such that sides 31a,31b are aligned with one another. Alternatively, the first member stop 29a and the second member stop 29b of the rotatable member 26 can be offset with respect to one another on the opposing first member side 26a and second member side 26b, such that the sides 31a,31b are misaligned.

Figure 4:
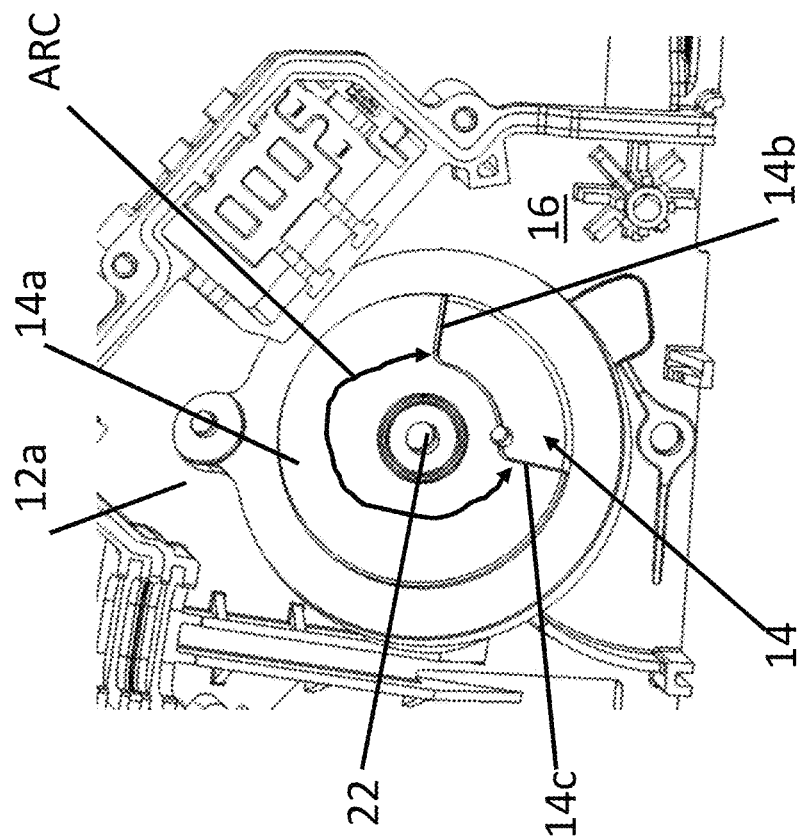
FIG. 4 is a perspective view of a portion of the housing of FIG. 1.

Referring to FIG. 4, the housing portion 12a has the housing stop 14 positioned on a housing body 16 of the housing 12, e.g. in the interior 6 of the housing 12 (see FIG. 1). The housing stop 14 can be provided as a section 14a (e.g. cavity 14a as shown, or as a projection from the body 16—not shown) in the housing body 16, the section 14a in the shape of a sector about the gear axis 22. The housing stop 14 has a first abutment 14b and a second abutment 14c located on opposite sides of the section 14a. As such, the housing stop 14 (e.g. in the form of the cavity 14a) of the housing 12 (i.e. housing portion 12b) only extends a portion of the way about the gear axis 22, so as to provide the first abutment 14b and the second abutment 14c. It is clear that the first abutment 14b and the second abutment 14c are spaced apart from one another about the gear axis 22.

Figure 5:
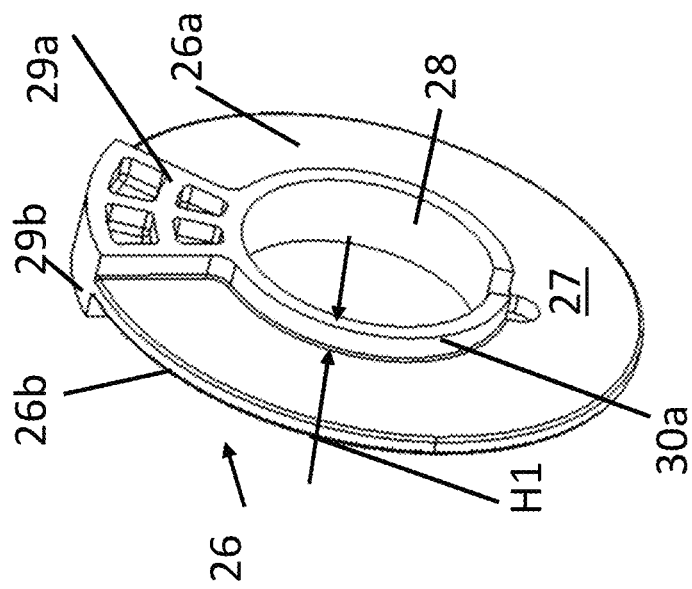
FIG. 5 is a perspective view of a rotatable member of the gear arrangement of FIG. 1.
Figure 6C:
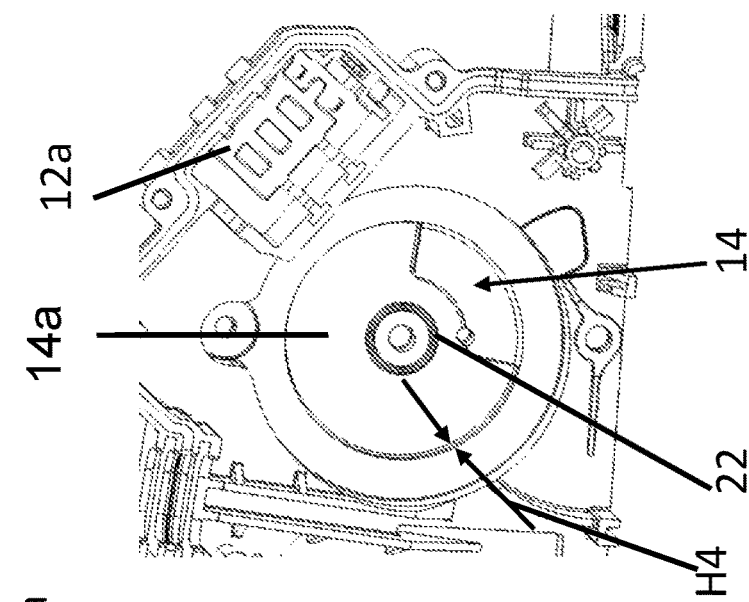
FIGS. 6a,b,c are perspective views of the housing of FIG. 1 showing an assembly of the gear arrangement of FIG. 1.
Figure 6B:
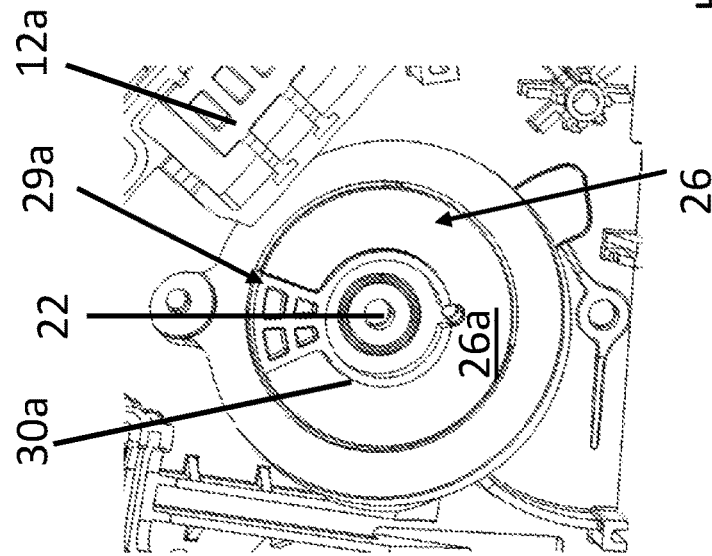
Figure 6A:
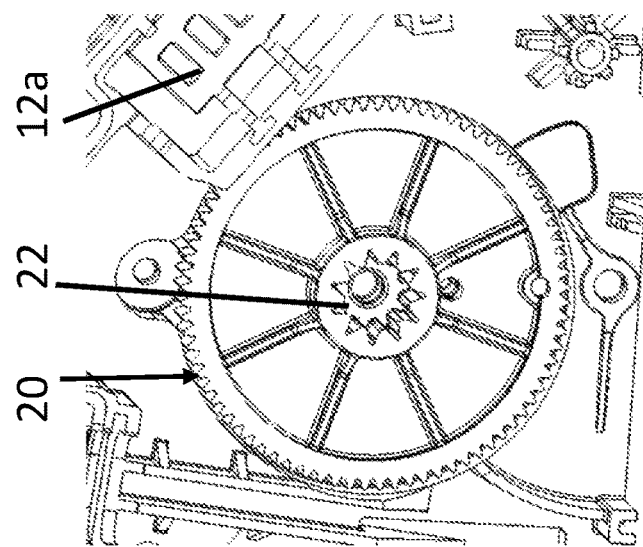

Referring to FIGS. 5 and 8, the second member side 26b has a second raised lip 30b projecting from the second member side 26b, such that the second raised lip 30b projects around the gear mount 28. A height H3 of the second raised lip 30b is commensurate with a height H4 of the cavity 14a (of the housing stop 14—see FIG. 6), such that when the second member side 26b is mounted adjacent to the housing 12, the second member stop 29b can travel along the surface of section 14a (between the first abutment 14b and the second abutment 14c) as the rotatable member 26 rotates relative to the housing 12 about the gear axis 22.

Figure 9:
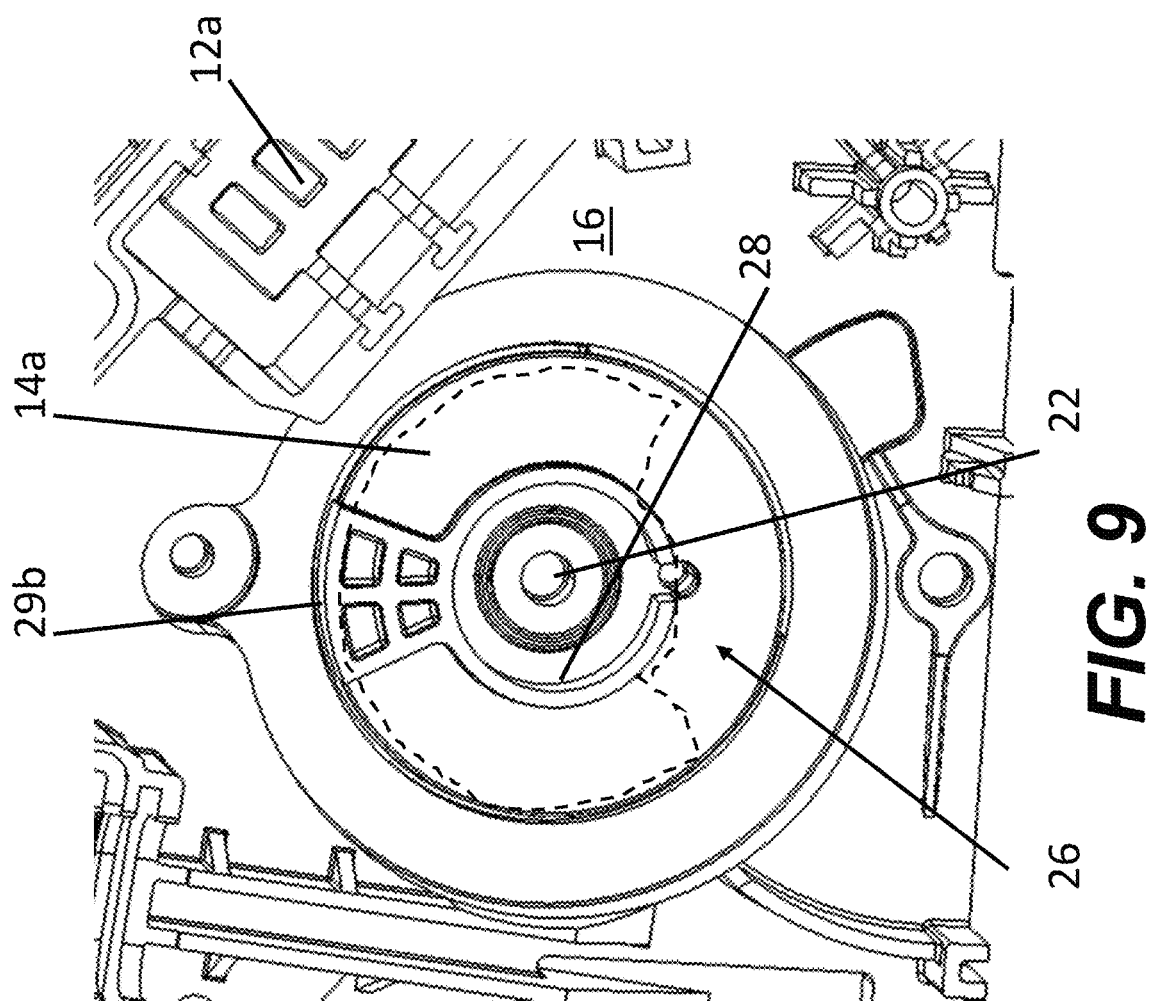
FIG. 9 is further plan view of the rotatable member of FIG. 1 installed in the housing.
Figure 10:
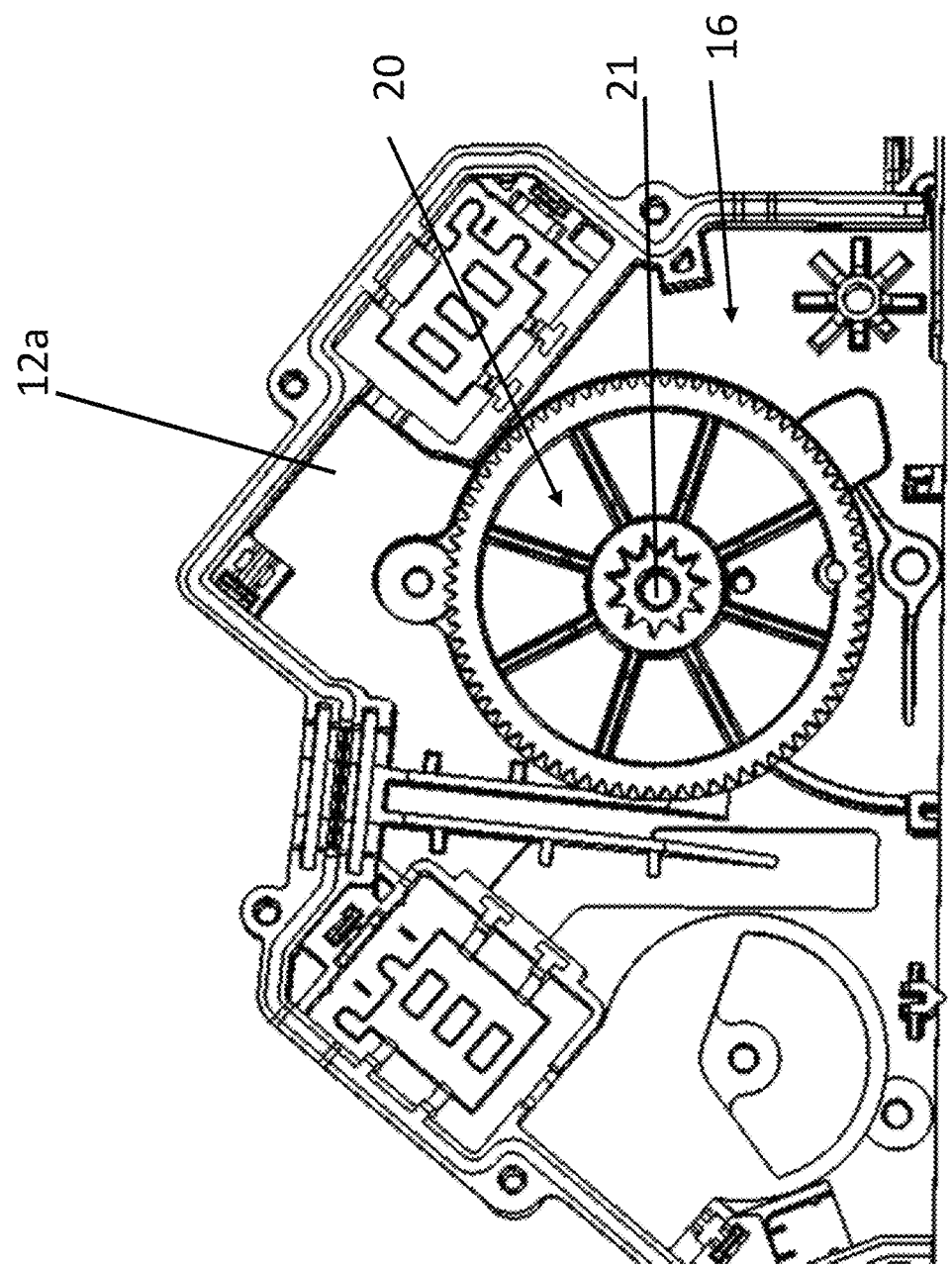
FIG. 10 is further plan view of the gear of FIG. 1 installed with the rotatable member in the housing.

See FIG. 9 showing the rotatable member 26 and the housing portion 12a mounted to one another, such that the section 14a is shown in ghosted view for clarity purposes only. As such, the second member side 26b also has the second member stop 29b projecting from the second member side 26b, such that the rotatable member 26 and the housing 12 can rotate relative to one another (about the gear axis 22) until the second member stop 29b comes into contact with either the first abutment 14b or the second abutment 14c (see FIGS. 11a,b,c), as further described below.

As shown in FIG. 9, once assembled, the second member stop 29b (opposite to and thus directly underneath the first member stop 29a) is positioned between the second member side 26b and the housing body 16. Accordingly, as the member body 27 is free to rotate relative to the housing 12 about the gear axis 22, the member body 27 will rotate relative to the housing 12 as long as the second member stop 29b and one of the abutments 14b,c are not in contact with one another. Alternatively, as further described below, when the second member stop 29b comes into contact with one of the abutments 14b,c, rotation of the rotatable member 26 about the gear axis 22 will be arrested (i.e. inhibited). It is recognized that due to the interaction of the gear stop 24 and the first member stop 29a, as described above, the bodies 19,27 will be rotating conjointly (i.e. together or otherwise simultaneously) about the gear axis 22 until the second member stop 29b contacts either abutment 14b,c of the housing stop 14, as further described below. Rotatable member 26 and gear 20 are shown in FIG. 7 as being co-axial, or are arranged to rotate about a common axis. Rotatable member 26 is shown as being provided in an overlapping, or side by side arrangement and nest arrangement with gear 20 as shown in FIG. 7. Rotatable member 26 is shown as being provided having a smaller outer diameter than gear 20.

Figure 11:
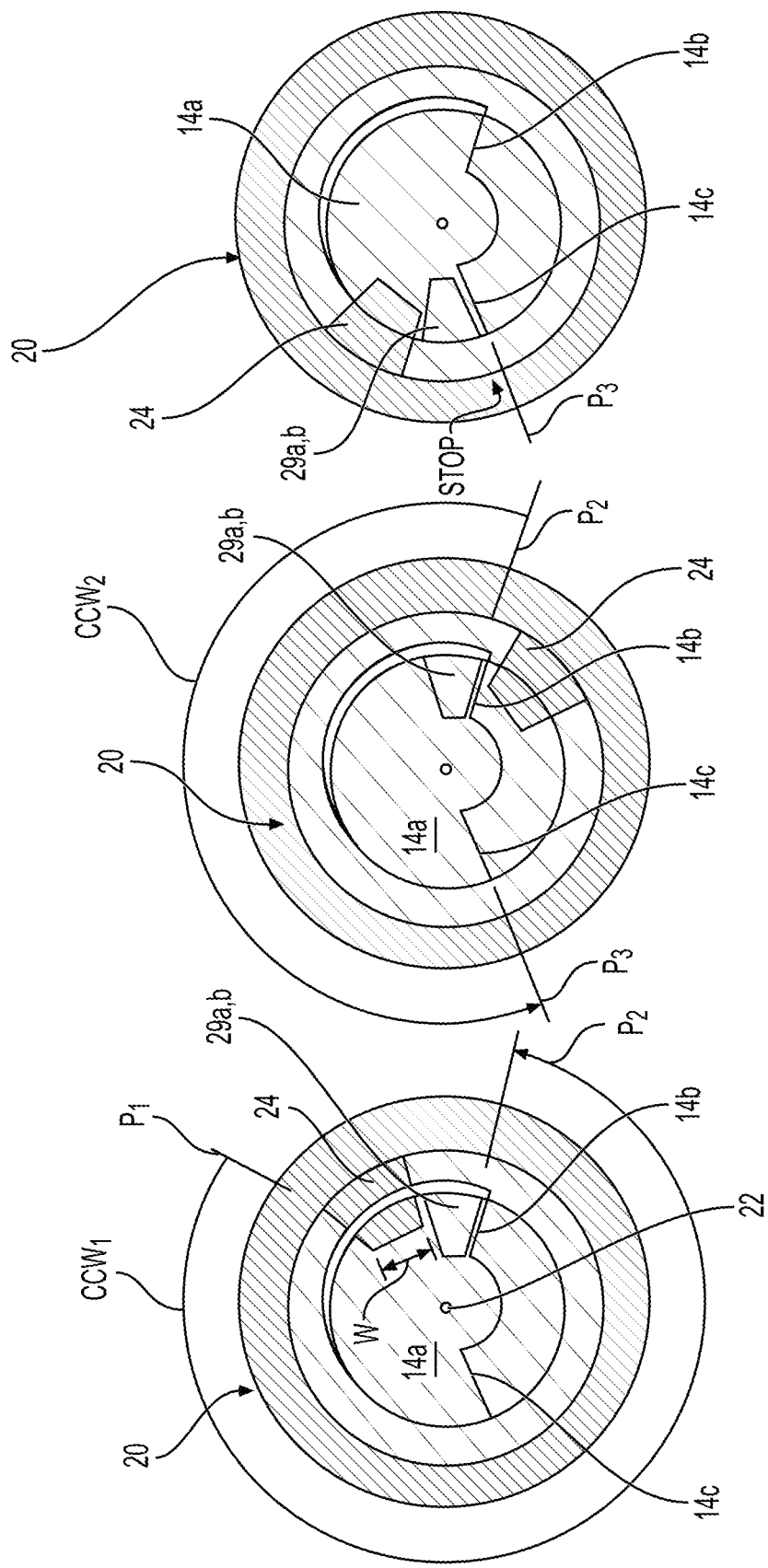
FIGS. 11a,b,c are example plan views demonstrating operation of the gear arrangement of FIG. 1.

In terms of operation of the gear assembly 10, as shown in FIG. 11a, the gear stop 24 (of the gear 20) is free to rotate in a first stage (CCW1) in a first direction (e.g. counter clockwise direction CCW from position P1 to position P2) about the gear axis 22 (as driven by one of the plurality of gears 11 of the gear box reduction mechanism 13—see FIG. 1). As provided by example only, the magnitude of the CCW rotation of the gear 20 between positon P1 and position P2 is somewhat less than 360 degrees (e.g. 360 degrees less a width of the gear stop 24), such that the rotatable member 26 remains preferably stationary about the gear axis 22 as the gear 20 rotates during the first stage.

In this manner, the gear body 19 rotates about the gear axis 22 relative to the member body 27, as the gear stop 24 and the first member stop 29a are disengaged (e.g. out of contact) with one another as the gear 20 does the first stage CCW1 rotation. However, it is also recognised that both bodies 19, 27 can rotate at the same time during the first stage, however not conjointly (i.e. not at the same speed of rotation about the gear axis 22) as the gear stop 24 and the first member stop 29a are disengaged from one another. Accordingly, the result of the first stage rotation CCW1 of the gear 20 is positioning of the gear stop 24 from the position P1 shown in FIG. 11a to the position P2 shown in FIG. 11b.

Referring to FIG. 11b, at position P2 the gear stop 24 can contact the first member stop 29a (positioned at the first abutment 14b and thus both the bodies 19,27 experience conjoint rotation during a second stage CCW2 in the same first direction (e.g. from position P2 to position P3) about the gear axis 22. In other words, both bodies 19,27 experience conjoint rotation once the gear stop 24 engages with the first member stop 29a. From position P2 to position P3, the second member stop 29b travels in the section 14a between the first abutment 14b and the second abutment 14c, as the gear stop 24 and the first member stop 29a remain in engagement. In other words, the result of the second stage CCW2 is that the gear stop and the first member stop 29a travel together from their position of engagement (e.g. at or near the first abutment 14b), shown by example in FIG. 11b to the position P3 shown in FIG. 11c. Upon reaching position P3, see FIG. 11c, the second member stop 29b contacts the second abutment 14c and a third stage of motion (STOP) provides for stopping of the conjoint rotation of the rotatable member 26 and the gear 20. In view of the above, it is recognized that the transition from the first stage CCW1 to the second stage CCW2 can at the first abutment 14b, in the case where the first member stop 29a is located at the first abutment 14b when the gear stop 24 engages with the first member stop 29a. Alternatively, the transition from the first stage CCW1 to the second stage CCW2 can between the first abutment 14b and the second abutment 14c, in the case where the first member stop 29a is located between the first abutment 14b and the second abutment 14c when the gear stop 24 engages with the first member stop 29a.

Similarly, upon reversal of the gear 20, thus moving the gear 20 in a second direction opposite the first direction (e.g. clockwise CW) from the position P3 back towards position P2, the gear stop 24 would disengage from the first member stop 29a while the second member stop 29b would remain adjacent (preferably) with the second abutment 14c. As such, the gear body 19 would continue to rotate about the gear axis 22 (in the second direction), in relative rotation with respect to the member body 27, and would bypass position P2 until reaching position P3. At or about position P3, the gear stop 24 would engage with the first member stop 29a and thus the bodies 19, 27 would continue under conjoint rotation about the gear axis 22 in the second direction. Once the conjointly rotating bodies 19, 27 reach position P1, the second member stop 29b would contact the first abutment 14b and thus the conjoint rotation of the bodies 19,27 would be stopped/inhibited. In view of the above, it is recognized that the transition from the first stage CCW1 to the second stage CCW2 in the second direction can at the second abutment 14c, in the case where the first member stop 29a is located at the second abutment 14c when the gear stop 24 engages with the first member stop 29a. Alternatively, the transition from the first stage CCW1 to the second stage CCW2 in the second direction can between the first abutment 14b and the second abutment 14c, in the case where the first member stop 29a is located between the first abutment 14b and the second abutment 14c when the gear stop 24 engages with the first member stop 29a.

In this manner, as described above, the gear 20 would be free to rotate in a first direction about the gear axis 22 (in the first stage CCW1 of the first direction) as relative rotation with respect to the rotatable member 26, as the second member stop 29b remains (preferably) positioned adjacent to the first abutment 14b. Once the gear stop 24 and the first member stop 29a become engaged (upon almost a complete rotation about the gear axis 22), both bodies 19,27 would continue to rotate conjointly about the gear axis 22 (in the second stage CCW2 of the first direction) until the second member stop 29b contacts the second abutment 14c. At this position, while the gear stop 24 and the first member stop 29a are in engagement, the second member stop 29b contacts the second abutment 14c and thus stops/inhibits the conjoint rotation of the bodies 19, 27 at a third stage STOP. It is recognised that the degree of conjoint rotation of the bodies 19, 27 (once the gear stop 24 and the first member stop 29a become engaged) is dependent upon a sector length ARC (see FIG. 4) of the section 14a between the first abutment 14b and the second abutment 14c. In any event, the total degree of rotation of the gear 20 about the gear axis 22 in the first direction is greater than 360 degrees in view of the second member stop 29b travelling between the first abutment 14b and the second abutment 14c once conjoint rotation of the bodies 19, 27 begins (at the second stage CCW2). The total degree of rotation of the gear 20 in the first direction includes the rotation during the first stage CCW1 (relative to the rotatable member 26), and includes the rotation during the second stage CCW2 (conjointly with the rotatable member 26)— the second stage CCW2 incorporating the second member stop 29b traveling from the first abutment 14b to the second abutment 14c.

Similarly, upon a return travel of the gear 20 in the second direction that is opposite to the first direction, the total degree of rotation in the second direction would also be greater than 360 degrees. In this manner, as described above, the gear 20 would be free to rotate in the second direction about the gear axis 22 (in the first stage CCW1 of the second direction) as relative rotation with respect to the rotatable member 26, as the second member stop 29b remains (preferably) positioned adjacent to the second abutment 14c. Once the gear stop 24 and the first member stop 29a become engaged (upon almost a complete rotation about the gear axis 22 in the second direction), both bodies 19,27 would continue to rotate conjointly about the gear axis 22 (in the second stage CCW2 of the second direction) until the second member stop 29b contacts the first abutment 14b. At this position, while the gear stop 24 and the first member stop 29a are in engagement, the second member stop 29b contacts the first abutment 14b and thus stops/inhibits the conjoint rotation of the bodies 19, 27 in the second direction. It is recognised that the degree of conjoint rotation of the bodies 19, 27 (once the gear stop 24 and the first member stop 29a become engaged) is dependent upon the sector length ARC (see FIG. 4) of the section 14a between the first abutment 14b and the second abutment 14c. In any event, the total degree of rotation of the gear 20 about the gear axis 22 in the second direction is greater than 360 degrees in view of the second member stop 29b travelling from the second abutment 14b to the first abutment 14c. The total degree of rotation of the gear 20 in the second direction includes the rotation during the first stage CCW1 (relative to the rotatable member 26), and includes the rotation during the second stage CCW2 (conjointly with the rotatable member 26)—the second stage CCW2 incorporating the second member stop 29b traveling between the second abutment 14b and the first abutment 14c. As such, the gear arrangement 10 is such that the rotation in the first direction comprises the first stage CCW1 and the second stage CCW2, the second stage CCW2 including the first member stop 29a travelling between the first abutment 14b and the second abutment 14c, such that a total degree of rotation of the first stage CCW1 and the second stage CCW2 in the first direction is greater than 360 degrees.

Figure 12:
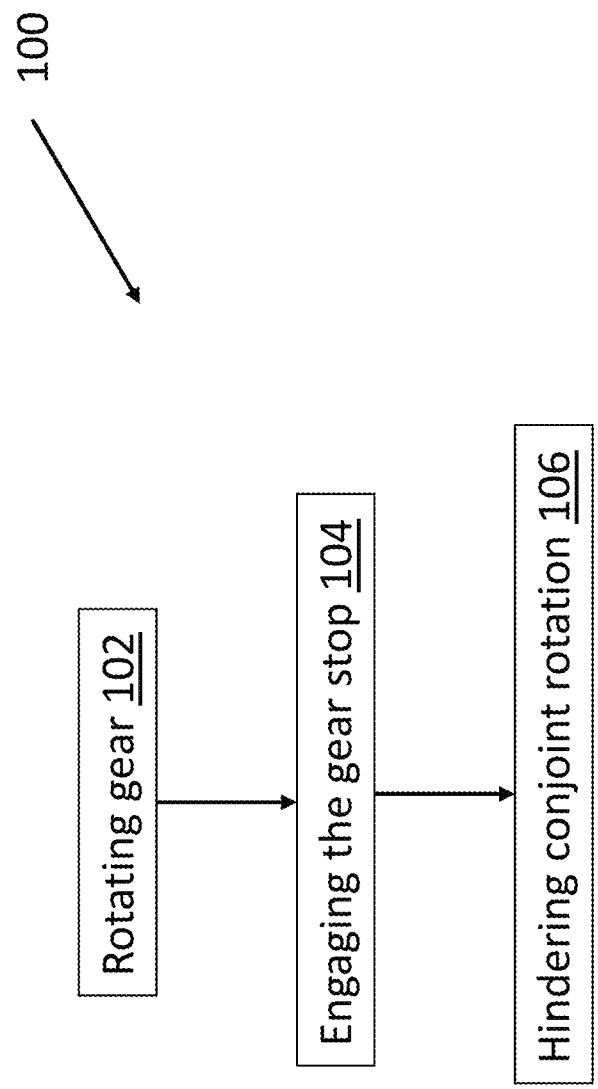
FIG. 12 is a flowchart of an example operation of the gear arrangement of FIG. 1.

Referring to FIG. 12, shown is an example operation of the gear arrangement 10 of FIG. 1. Accordingly, a method 100 of controlling rotation of a gear 20 with respect to a housing stop 14 of a housing 12 has the steps of: rotating 102 the gear 20 about a gear axis 22 in a first direction during a first stage CCW1, such that a gear stop 24 of the gear 20 is decoupled from the housing stop 14, the gear 20 rotating relative a rotatable member 26 also mounted on the gear axis 22; engaging 104 the gear stop 24 with a first member stop 29a of the rotatable member 26; rotating conjointly the gear 20 and the rotatable member 26 in the first direction during a second stage; while the gear stop 24 and the first member 29a are engaged; and hindering 106 said rotating conjointly when a first member stop 29a of the rotatable member 26 engages with an abutment 14b,c of the housing stop 14, such that engagement of the first member stop 29a with the abutment 14b,c causes the gear stop 24 to become coupled with the abutment 14b,c.

In view of the above described gear arrangement 10, the inclusion of the rotatable member 26 and associated housing stop 14 can be beneficial for cinching functionality in automotive applications, as an example which requires a large activation range which one complete revolution of a gear 20 or less than one complete revolution (e.g. less than or equal to 360 degrees of gear 20 rotation between stopping—i.e. engaging the abutment(s) 14b,c) would not provide sufficient activation travel for the cinch. It is recognized that other types of mechanisms (e.g. influenced by activation) can also benefit from this gear arrangement 10, as the gear 20 can be made smaller (more compact) since the gear 20 can be rotated more than 360 degrees by above described gear arrangement 10. For example and with reference to FIG. 13, the gear arrangement 10 may be provided as part of a latch assembly 13' (see FIG. 12) as part of a power release gear train, such as shown in US patent application 20200080350A1 entitled "Closure latch for vehicle door", the entire contents of which are incorporated herein by reference. The gear arrangement 10 may be provided with other applications such as a remote standalone cable actuator, or other type of actuator, integrated or stand alone.

Figure 13:
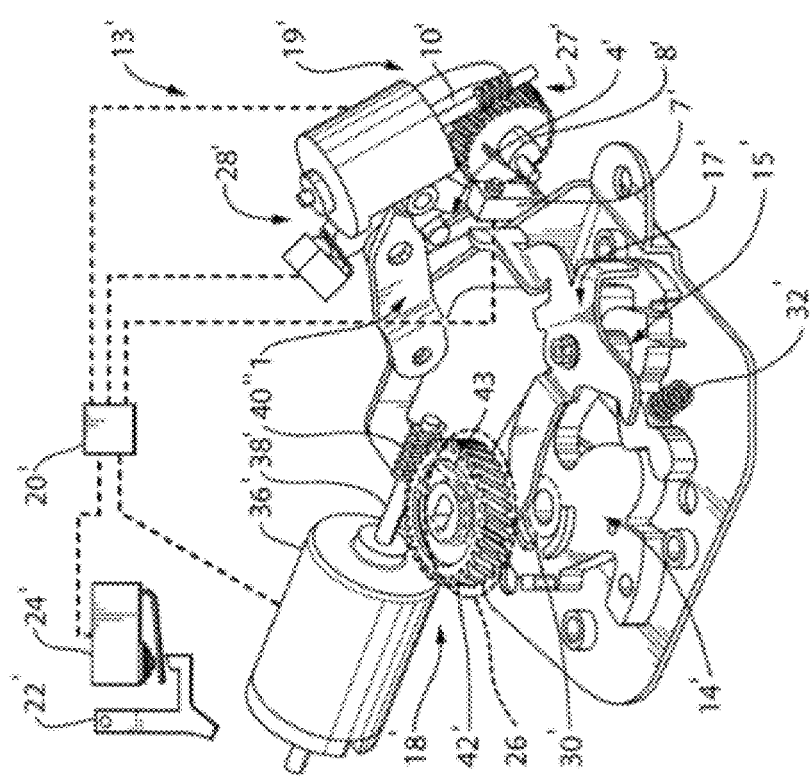
FIG. 13 is an automotive latch assembly in accordance with an illustrative example.

Now referring to FIG. 13, there is provided a closure latch 13' including a ratchet 14' a pawl 15', a pawl release lever 17', an inside door release lever 1', a power release actuator 18' and a lock 27', which includes a lock mechanism 28' and a lock actuator 19'. The ratchet 14' is movable between a closed position (FIG. 1) wherein the ratchet 14' retains a striker, and an open position wherein the ratchet 14' permits release of the striker. Still referring to FIG. 13, a ratchet biasing member 30', such as a torsion spring, can be provided to bias the ratchet 14' towards the open position. The pawl 15' is movable between a ratchet locking position wherein the pawl 15' holds the ratchet 14' in the closed position, and a ratchet release position wherein the pawl 15' permits the ratchet 14' to be in the open position. A pawl biasing member 32', such as a suitable spring, may be provided to bias the pawl 15' towards the ratchet locking position. The pawl release lever 17' is operatively connected to the pawl 15' and is movable between a pawl release position wherein the pawl release lever 17' moves the pawl 15' to the ratchet release position, and a home position wherein the pawl release lever 17' permits the pawl 15' to be in the ratchet locking position. A release lever biasing member 34', such as a suitable spring, may be provided to bias the pawl release lever 17' to the home position. The pawl release lever 17' may be moved to the pawl release position by several components, such as, for example, by the power release actuator 18', by the inside door release lever 1. The power release actuator 18' includes a power release actuator motor 36' having a power release actuator motor output shaft 38', a power release worm gear 40" mounted on the output shaft 38', and a power release driven gear 42' (e.g. similar to the gear 20 shown in FIG. 1). A power release cam 43 is connected for rotation with the driven gear 42' and is rotatable between a pawl release range of positions and a pawl non-release range of positions. Accordingly, driven gear 42' has the gear stop 24 (see FIG. 3), which is positioned on the second gear side 20b (not shown in FIG. 13 as first gear side 20a is exposed and shown in FIG. 13.

In FIG. 13, the power release cam 43 is in a position that is within the pawl non-release range. The driven gear 42' is driven by the worm gear 40" and in turn drives the cam 43 which drives the pivoting of the pawl release lever 17' between the home and pawl release positions. Driven gear 42' (e.g. a further embodiment of the gear 20—see FIG. 3) is adapted with the teachings herein for interacting with the rotatable member 26 (shown in ghosted view) for controlling the extents of rotation of the driven gear 42'. The power release actuator 18' can be used as part of a passive entry feature. When a person approaches the vehicle with an electronic key fob and opens the outside door handle 22', the vehicle senses both the presence of the key fob and that the door handle 22' has been actuated (e.g. via communication between a switch 24' and an electronic control unit (ECU) shown at 20' that at least partially controls the operation of the closure latch 13'). In turn, the ECU 20' actuates the power release actuator 18' to open the closure latch 13', so as to open the vehicle door.

We claim:

1. A gear arrangement (10) comprising:
a housing (12) having a housing stop (14);
a rotatable member (26), the rotatable member (26) engageable and disengageable with the housing stop; and
a gear (20) having a gear stop, the gear stop engageable and disengageable with the rotatable member during rotation of the gear, the rotatable member mounted adjacent to the gear;
wherein said rotation of the gear is not hindered while the rotatable member is disengaged from the housing stop;
wherein the housing (12) has a gear axis (22), the housing stop having a first abutment (14b) and a second abutment (14c) spaced apart from one another about the gear axis;
wherein the rotatable member (26) is mounted on the gear axis, the rotatable member having a first member side (26a) having a first member stop (29a) and a second member side (26b) having a second member stop (26b), the first member side opposite the second member side, such that the first member stop is positioned between the first abutment and the second abutment; and
wherein the gear (20) is mounted on the gear axis, the gear having a first gear side (20a), and a second gear side (20b) having the gear stop (24), the first gear side opposite the second gear side, such that the gear stop is engageable and disengageable with the second member stop during rotation of the gear about the gear axis, the rotatable member positioned between the housing and the gear; and
wherein said rotation of the gear is hindered while the gear stop and the second member stop are engaged when the first member stop enters into engagement with either the first abutment or the second abutment.

2. The gear arrangement of claim 1 further comprising a plurality of gears (11) coupled to the gear.

3. The gear arrangement of claim 2, wherein the gear and the plurality of gears are included in a gear reduction mechanism (13).

4. The gear arrangement of claim 1, wherein the rotatable member is a disk, such that the disk is mounted on the first gear side and the gear moves relative to the disk during said rotation for at least a portion of said rotation about the gear axis.

5. The gear arrangement of claim 1, further comprising the second gear side having a recess (15), such that the rotatable member is positioned at least partly within the recess when situated on the gear axis between the housing and the gear.

6. The gear arrangement of claim 5, wherein the second member stop projects from a side (17) of the second gear side (20b) and into the housing stop provided as a cavity (14a).

7. The gear arrangement of claim 1, wherein the first member stop and the second member stop of the rotatable member are directly opposite to one another.

8. The gear arrangement of claim 1, wherein the first member stop and the second member stop of the rotatable member are offset with respect to one another on the opposing first member side and second member side.

9. The gear arrangement of claim 1, wherein said rotation in a first direction comprises a first stage and a second stage, the second stage including the first member stop travelling between the first abutment and the second abutment, such that a total degree of rotation of the first stage and the second stage in the first direction is greater than 360 degrees.

10. The gear arrangement claim 1, wherein the housing is part of a latch assembly.

* * * * *